Figures 1, 2:
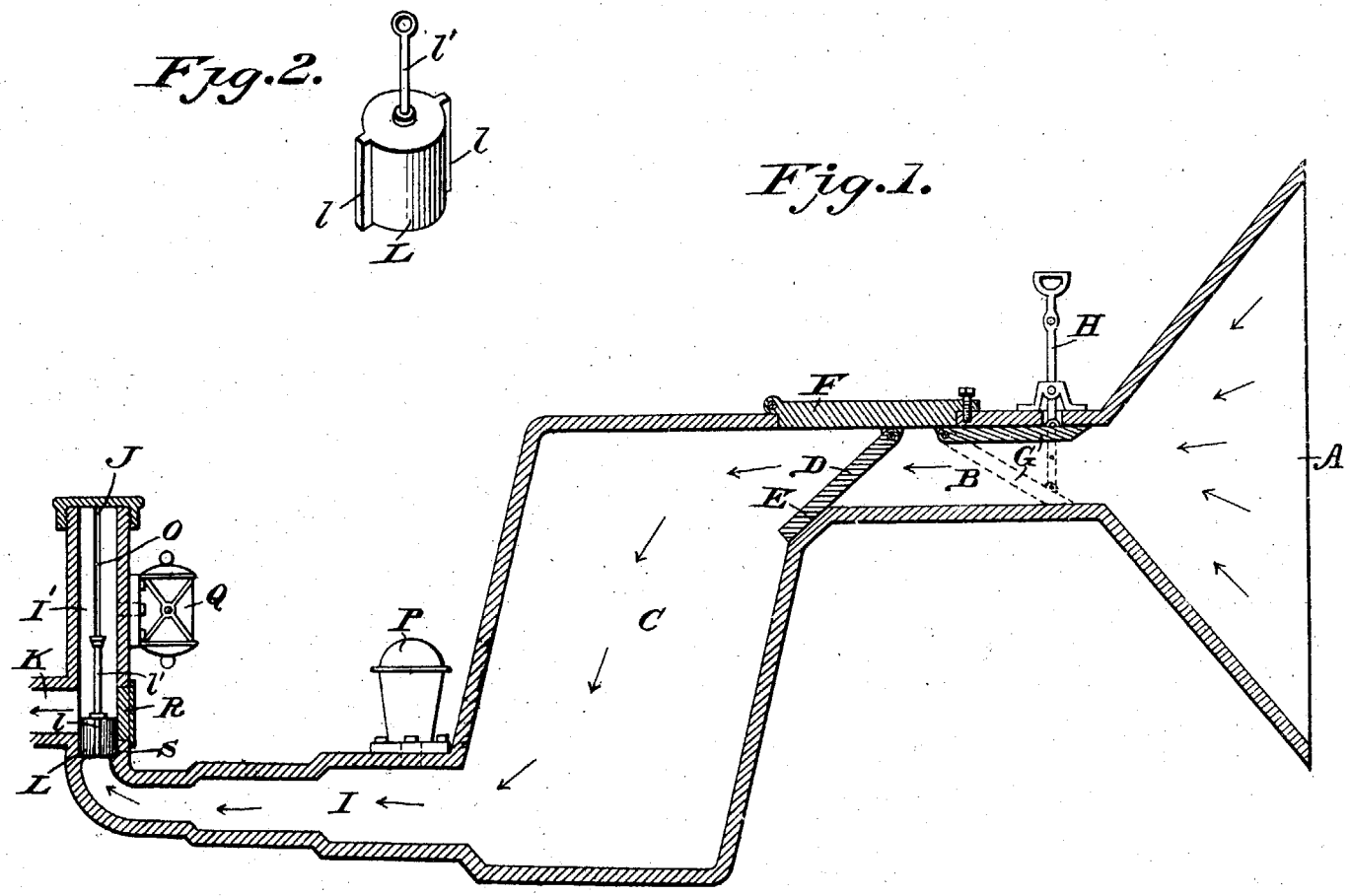

No. 11,807. Reissued Jan. 30, 1900.

J. ROGOWSKI.

WAVE POWER WATER MOVING APPARATUS.

(Application filed Dec. 8, 1899.)

Witnesses
Edwin H. McKee
D. T. Hollingsworth

John Rogowski Inventor
By E. G. Siggers Attorney

THE ECKERT LITHOGRAPHING CO., WASHINGTON, D. C.

UNITED STATES PATENT OFFICE.

JOHN ROGOWSKI, OF LITTLE ROCK, ARKANSAS.

WAVE-POWER WATER-MOVING APPARATUS.

SPECIFICATION forming part of Reissued Letters Patent No. 11,807, dated January 30, 1900.

Original No. 630,006, dated August 1, 1899. Application for reissue filed December 8, 1899. Serial No. 739,626.

*To all whom it may concern:*

Be it known that I, JOHN ROGOWSKI, a citizen of the United States, residing at Little Rock, in the county of Pulaski and State of Arkansas, have invented an Improvement in Wave-Power Water-Moving Apparatus, of which the following is a specification.

My invention relates to a wave-power water-moving apparatus which is especially designed to furnish a supply of water through the action of waves upon the sea-coast.

My invention consists in the parts and the construction and combination of parts hereinafter described and claimed.

In the drawings, Figure 1 is a vertical longitudinal section through my apparatus. Fig. 2 is a detail of the cylindrical valve.

A is the funnel-shaped mouth of the apparatus, and it is mounted at such a point that the waves will rush into it as each one rises in that direction, and it is so constructed that the mouth will be considerably larger than the rear or contracted end, so that waves striking in the mouth of the funnel will be concentrated into the contracted portion, from which the water is carried through a passage B and delivered into the upper part of the reservoir or chamber C. This chamber C is disposed in a substantially upright position and is arranged to depend from and project a material distance below the point of connection with the inlet-passage B for the apparatus. In order to control the supply of water to this reservoir or chamber and to prevent its return after it has entered, I have shown a hinged flap-valve D, one edge of which is hinged in the upper part of the passage B, and the other edge falls by gravitation, resting upon an incline E, which is in line with the hinged valve, so that the movable end may lie upon this surface and form a closure to prevent the return of water through the pipe or passage B. Whenever the water dashes into this passage, it will lift the valve D and pass into the chamber C, the valve D closing immediately after the rush of inflowing water has ceased. If for any reason it is desired to obtain access to this valve for repairs or other purposes, it is effected by means of a gate or door F, fitted in the top of the passage B above the valve D, this door having a suitable hinge at one side and a locking and holding device at the other. When it is desired to obtain access to this valve or to other parts of the apparatus or for other reasons to close the water-supply temporarily, it is effected by means of a gate or valve G, which may be hinged and operated by a shank H, connected with its movable end, or it may be in the form of the well-known vertically-movable water-gate. In either case it is fitted to the passage B exterior to the automatic valve D and when closed prevents any ingress of water.

The receiving reservoir or chamber C has extended from the lower portion thereof, in a correspondingly opposite position to the upper inlet passage or pipe B, a discharge pipe or passage I, which, as shown in the drawings, is preferably constructed of progressively-diminishing sections from its point of connection at the reservoir or chamber C primarily to facilitate connection of said pipe or passage I with the delivery-pipe K and the upstanding auxiliary compressed-air chamber I′ in the form of an upright extension of the said discharge pipe or passage I. While the diminishing bore of the discharge pipe or passage I facilitates connection thereof with its extension I′ and the delivery-pipe K, still it will be understood that inasmuch as the inrushing water entering the receiving reservoir or chamber C will necessarily provide for a compression of air in such chamber this compression of the air will be necessarily increased by the diminishing size of the pipe or passage I and will therefore facilitate the forcible discharge of water through the delivery-pipe K to the point of storage or use.

In carrying out the invention the lower discharge pipe or passage I is preferably arranged in an approximately horizontal position, and the small end of this pipe or passage is suitably connected with the delivery-pipe K, extending laterally therefrom to any suitable point where it may be desired to store or use the water. The said delivery-pipe K not only communicates with the outlet of the discharge pipe or passage I, but is also in communication with the lower end of the upright auxiliary compressed-air chamber I′, which arises from the outlet end of the said discharge pipe or vessel I and constitutes a chamber within which air is compressed to be subsequently discharged through the delivery-pipe K in the manner to be presently explained. The said upright auxiliary compressed-air chamber I′ is preferably closed at its upper end by a suitable cap J, and it is also provided in the opposite sides thereof with interior guideways O, which slidably receive therein the guide ribs or wings *l*, projected laterally from opposite sides of the cylindrical piston-valve L. The said cylindrical piston-valve L is designed to register within the compressed-air chamber I′, so as to constitute a piston for compressing air therein, the upward movement of said valve being limited by a stop-arm *l*′, extending from the upper side thereof and adapted to engage with the closed upper end of the said chamber I′. Normally the said cylindrical piston-valve L is adapted to register within the valve-seat S, formed in the outlet end of the discharge pipe or passage I, below the plane of the delivery-pipe connection K therewith. When the valve L closes into the seat S, and thereby prevents the backflow of water or air into the discharge pipe or passage I, the same leaves the delivery-pipe connection K uncovered, so that it may communicate with the interior of the compressed-air chamber I′, as plainly shown in Fig. 1 of the drawings. The valve L is therefore sufficiently short in length so as to not extend across the port communicating with the delivery-pipe K when the valve is in its closed position, thereby rendering the auxiliary compressed-air chamber I′ operative, so that the air which may have been previously compressed therein will find escape through the delivery-pipe K.

In the action of the apparatus when the water rushes through the funnel A and into the receiving reservoir or chamber C the same, together with the air compressed thereby, passes through the discharge-pipe I and lifting the piston-valve L from its seat will find escape through the delivery-pipe K to the point of storage or use. The action of the inrushing water and compressed air which elevates the valve L forces the latter upward within the chamber I′, thereby compressing the air in the upper part of this chamber. When the impulse of the inrushing water ceases, the valve L, aided by the compressed air within the chamber I′, gravitates to its seat, thereby permitting the compressed air to pass out of the said chamber I′ and into the delivery-pipe K to assist in moving the water therein to the point of storage or use. Any suitable means of cushioning the valve L in either its upper or downward movements may be resorted to without departing from the present invention; but the guideways O preferably terminate at a point below the plane of the delivery-pipe connection K to constitute stops for arresting the valve when it reaches its seat at the outlet end of the pipe or passage I′.

To provide for storing a maximum amount of compressed air in connection with the main chamber C, as well as in connection with the auxiliary chamber I′, there are preferably employed the supplemental air-chambers P and Q, the chamber P being fitted to and in communication with a discharge-pipe I and the supplemental chamber Q being fitted to and in communication with the auxiliary compressed-air chamber I′ above the point of communication with the delivery-pipe K.

By means of a door or gate R, formed in the side of the vertical chamber I′ and approximately opposite the passage K, the valve L can be easily reached at any time when desired.

The apparatus forms a simple and effective water-supply which is kept in almost constant operation by the flow and impulse of the waves.

My apparatus may be built of any suitable materials and in any manner of shape and of any size chamber or reservoir. My apparatus is especially adapted for flat sea-coasts. It cannot be operated on cliffs or rocks.

Having thus described my invention, what I claim as new, and desire to secure by Letters Patent, is—

1. An apparatus for concentrating and conducting water consisting of a pipe having a funnel-mouth opening toward the sea, an automatic check-valve for preventing the return of the water through the pipe, a receiving reservoir or chamber having said pipe discharge into the upper portion thereof, and of larger dimensions than said pipe, a second pipe connecting with the lower portion of said reservoir or chamber and having an upstanding extension with guides, a delivery-pipe leading from said upstanding extension, and a vertically-reciprocating valve arranged to work within the said extension and arranged to prevent a return flow through said pipe, substantially as described.

2. In an apparatus for storing and conducting water, a wide-mouthed funnel opening toward the sea, a horizontal pipe connected with the contracted end of the funnel having a manually-operated gate, a chamber or reservoir of larger dimensions than the said pipe, and having the same discharging into the upper part thereof, a second pipe connecting with the bottom of said reservoir or chamber, an auxiliary compressed-air chamber connected with the outlet end of said second pipe and having guideways formed in its sides, a valve having wings movable in said guideways, and a delivery-pipe communicating with the auxiliary air-chamber contiguous to its connection of said second pipe, substantially as described.

3. In an apparatus for concentrating and conducting water, the combination of a receiving reservoir or chamber, a pipe leading into the upper portion of the reservoir or chamber, and having a funnel-shaped mouth opening toward the sea, a pipe leading from the lower portion of the reservoir or chamber, a check-valve in the first-named pipe, and a valve or gate in advance of said check-valve, a delivery-pipe connected with the second-named pipe, and a valve controlling the admission of water to the said delivery-pipe, substantially as described.

4. In an apparatus of the class described, a receiving reservoir or chamber having an inlet pipe or passage communicating at one side thereof, a discharge-pipe in communication with the opposite side of the reservoir or chamber, an auxiliary compressed-air chamber communicating with the outlet end of the discharge-pipe, a delivery-pipe in communication with an auxiliary compressed-air chamber contiguous to the outlet end of the discharge-pipe, and a piston-valve adapted to be seated at the outlet end of the discharge-pipe, and arranged to reciprocate within the auxiliary compressed-air chamber, substantially as described.

5. In an apparatus of the class described, the combination with the receiving reservoir or chamber having a discharge-pipe, an auxiliary compressed-air chamber in communication with said discharge-pipe, a delivery-pipe in communication with both the discharge-pipe and said auxiliary compressed-air chamber, and a piston-valve adapted to reciprocate within the auxiliary compressed-air chamber, and arranged to act as a cut-off for said discharge-pipe when the said chamber is in communication with the delivery-pipe, substantially as described.

6. In an apparatus of the class described, the combination of the receiving reservoir or chamber having a discharge-pipe, an auxiliary compressed-air chamber arising from the outlet end of the discharge-pipe, a delivery-pipe communicating with the auxiliary compressed-air chamber contiguous to the outlet end of the discharge-pipe, and a reciprocating piston-valve normally seated at the outlet end of the discharge-pipe, said valve when seated being adapted to open up communication between the auxiliary chamber and the delivery-pipe, and when forced upward into said auxiliary chamber, to open up communication between said delivery-pipe and the discharge-pipe of the receiving-reservoir, substantially as described.

7. In an apparatus of the class described, a receiving reservoir or chamber having an inlet pipe or passage communicating at one side thereof, and a discharge-pipe in communication with the opposite side of the reservoir-chamber, said discharge-pipe having a progressively-diminishing bore.

8. In an apparatus of the class described, a receiving reservoir or chamber having an inlet pipe or passage communicating at one side thereof, a discharge-pipe in communication with the opposite side of the reservoir or chamber and having a progressively-diminishing bore, an auxiliary compressed-air chamber communicating with the outlet end of the discharge-pipe, a delivery-pipe in communication with the auxiliary compressed-air chamber contiguous to the outlet end of the discharge-pipe, and a piston-valve adapted to be seated at the outlet end of the discharge-pipe, and arranged to reciprocate within the auxiliary compressed-air chamber, substantially as described.

9. In an apparatus of the class described, a receiving reservoir or chamber having an inlet-pipe communicating at one side thereof, said inlet-pipe being provided with a gate or door, a discharge-pipe in communication with the opposite side of the reservoir or chamber, an auxiliary compressed-air chamber communicating with the outlet end of the discharge-pipe and also provided with a gate or door, a delivery-pipe in communication with said air-chamber, and a valve, substantially as described.

In testimony that I claim the foregoing as my own I have hereto affixed my signature in the presence of two witnesses.

JOHN ROGOWSKI.

Witnesses:
W. J. TERRY,
JOHN VICK.